United States Patent
Kudelski et al.

(10) Patent No.: US 7,433,473 B2
(45) Date of Patent: Oct. 7, 2008

(54) DATA TRANSMISSION METHOD BETWEEN A BROADCASTING CENTER AND A MULTIMEDIA UNIT

(75) Inventors: André Kudelski, Lutry (CH); Christophe Nicolas, Préverenges (CH); Nicolas Fischer, Versoix (CH)

(73) Assignee: NagraCard S.A., Cheseaux-sur-Lausanne (CH)

(*) Notice: Subject to any disclaimer, the term of this patent is extended or adjusted under 35 U.S.C. 154(b) by 405 days.

(21) Appl. No.: 11/214,833

(22) Filed: Aug. 31, 2005

(65) Prior Publication Data

US 2006/0056632 A1   Mar. 16, 2006

(30) Foreign Application Priority Data

Sep. 10, 2004   (EP)   ................................ 04104391

(51) Int. Cl.
H04L 9/00   (2006.01)
(52) U.S. Cl. ....................................... 380/259; 380/260
(58) Field of Classification Search ......... 380/259–260; 725/31

See application file for complete search history.

(56) References Cited

U.S. PATENT DOCUMENTS

| | | | | |
|---|---|---|---|---|
| 5,029,207 | A * | 7/1991 | Gammie | 380/228 |
| 5,631,961 | A * | 5/1997 | Mills et al. | 380/286 |
| 6,084,969 | A * | 7/2000 | Wright et al. | 380/271 |
| 6,134,662 | A * | 10/2000 | Levy et al. | 726/11 |
| 6,212,633 | B1 * | 4/2001 | Levy et al. | 713/153 |
| 6,507,950 | B1 * | 1/2003 | Tsukidate et al. | 725/54 |
| 6,711,263 | B1 * | 3/2004 | Nordenstam et al. | 380/282 |
| 6,834,110 | B1 * | 12/2004 | Marconcini et al. | 380/239 |
| 7,093,295 | B1 * | 8/2006 | Saito | 726/26 |
| 7,110,548 | B1 * | 9/2006 | Ougi et al. | 380/278 |
| 2001/0052078 | A1 * | 12/2001 | Kuroda et al. | 713/193 |
| 2001/0053226 | A1 * | 12/2001 | Akins et al. | 380/282 |
| 2003/0182579 | A1 * | 9/2003 | Leporini et al. | 713/201 |
| 2004/0123312 | A1 * | 6/2004 | Kimura | 725/31 |
| 2004/0205248 | A1 * | 10/2004 | Little et al. | 709/246 |
| 2004/0236953 | A1 * | 11/2004 | Merenne et al. | 713/182 |
| 2004/0252840 | A1 * | 12/2004 | Moriyama et al. | 380/277 |
| 2004/0260950 | A1 * | 12/2004 | Ougi et al. | 713/201 |

(Continued)

FOREIGN PATENT DOCUMENTS

WO   WO 99/48296   9/1999

(Continued)

OTHER PUBLICATIONS

Search Report and Written Opinion for related International Application No. PCT/EP2005/054472.

*Primary Examiner*—Kimyen Vu
*Assistant Examiner*—David Garcia Cervetti
(74) *Attorney, Agent, or Firm*—Harness, Dickey & Pierce, P.L.C.

(57) ABSTRACT

The aim of this invention is to propose a flexible solution to the risk represented by the interception of data by an unauthorized party during the transmission of said data between a broadcast center and a specialized decryption/decompression circuit such as is used in a Pay-TV decoder. This aim is achieved by a data transmission method involving a broadcast center or diffusion center, a management center and a multimedia unit, the latter comprising at least one unique key and a security module having a transport key.

6 Claims, 1 Drawing Sheet

U.S. PATENT DOCUMENTS

| | | | |
|---|---|---|---|
| 2004/0261112 A1* | 12/2004 | Hicks et al. | 725/89 |
| 2005/0195975 A1* | 9/2005 | Kawakita | 380/30 |

FOREIGN PATENT DOCUMENTS

| | | | |
|---|---|---|---|
| WO | WO 00/04718 | | 1/2000 |
| WO | WO 02/45336 | | 6/2002 |
| WO | WO 2004/008765 | | 1/2004 |
| WO | WO 2004/010698 | * | 1/2004 |

\* cited by examiner

DATA TRANSMISSION METHOD BETWEEN A BROADCASTING CENTER AND A MULTIMEDIA UNIT

DOMAIN OF THE INVENTION

The present invention relates to the domain of data transmissions on the Internet, in particular to broadband connections for the visualization of video content.

BACKGROUND ART

Systems are well known to allow access to broadcasted contents such as Pay-TV events. In brief, these systems function by means of a multimedia unit including an MPEG descrambler. The MPEG descrambler receives the contents and is responsible for analogically reproducing said contents, in particular through audio and video signals.

These systems that allow access to subscription or Pay-TV television contents are currently being developed. These systems use the Internet network and xDSL (Digital Subscriber Line) type lines and in particular ADSL (Asymmetric Digital Subscriber Line) type lines to provide subscribers with broadcasted contents.

In systems of this type, contents that can be a television channel, an event such as a film or in particular a sports match, a music file or other similar contents are emitted in the form of a stream by a diffusion centre. The contents are transmitted by means of a satellite, terrestrial link or cable connection or by a combination of these different means to a retransmission centre that is responsible for diffusing the data forming this content intended for the multimedia units concerned. In order to allow this diffusion, the retransmission centre comprises a routing device that is responsible for the routing of the data to the multimedia unit for which the data is intended. This type of routing device is known under the acronym DSLAM (Digital Subscriber Line Access Multiplexer).

In this type of current system, the users wishing to gain access to content proposed by a content provider must generally subscribe with this supplier. In this case, all the contents managed by this provider are accessible to the subscriber. In fact, it is considered that the identification of a user by his/her telephone line is sufficient to provide said user with access rights to these contents.

This means that audio/video contents are transmitted in plaintext between the routing device (DSLAM) and a subscriber. This situation has opened the way to abuses such as those known under the name "Address spoofing". Address Spoofing or IP Spoofing, consists in passing oneself off as someone else, by using his/her address on the network. In this way it is possible to make the provider believe that the connection or the transmission request for contents originates from an authorized user account.

A first solution to this problem has been proposed in the document WO2004/010698 that consists of encrypting the contents transmitted in a specific way. This document relates to the personalization of contents using specific control words. The transport medium is not affected by personalization operations.

BRIEF DESCRIPTION OF THE INVENTION

The aim of this invention is to propose a flexible solution to this risk in order to prevent conditional access content from being used by any unauthorized individual.

This aim is achieved through a data transmission method between a diffusion centre and a multimedia unit, the latter comprising at least one unique key and a security module with a transport key, this method comprising the following steps:
  generation of a session key by a management centre,
  transmission of the session key to the diffusion centre,
  encryption of the session key by the unique key of the multimedia unit,
  transmission of a message encrypted by the transport key comprising the encrypted session key to the multimedia unit,
  transmission of the message to the security module by the multimedia unit,
  decryption of the message by the transport key of the security module and transmission of the encrypted session key to the multimedia unit,
  decryption of the session key encrypted by the unique key of the multimedia unit,
  creation of a connection secured by the encryption and decryption, by means of the session key, of data exchanged between the diffusion centre and the multimedia unit.

Therefore, in this way, the data transmitted by the Internet channel can only be understood by the legitimate user. If another user attempts to divert this information, it will serve no purpose as said user cannot decrypt the information without the unique key of the legitimate user.

The diffusion centre can take different forms. According to a first embodiment, the centre is located in another geographic location and managed by an entity other than the multimedia unit's supplier. According to this embodiment, it generally concerns the unit placed in a commutation centre (DSLAM) or directly the centre diffusing the different contents.

According to another embodiment, the diffusion centre is local. That is to say that one of the apparatuses of a user transmits contents to another apparatus (home networking). Thus the security channel is formed between these two devices of the same local network, the diffusion centre being a device disposing of the contents that one wishes to display or exploit on the other device, the multimedia unit.

The transport key is a key pertaining to the diffusion system of the messages between a management centre and a security module. This type of key can be of the global type, that is to say identical in a large number of modules, or can be of a specific type, namely unique for a given security module.

As is well known to those skilled in the art, the security module can essentially be produced according to four distinctive forms. One of these forms is a microprocessor card, a chip card, or more generally an electronic module (in the form of a key, a badge, a credit card . . . ). This type of module is generally removable and connectable to the decoder of multimedia unit. The form with electrical contacts is the most commonly used, but does not exclude a connection without contact, for example of the type ISO 14443.

A second known form is that of an integrated circuit casing, generally placed definitively and irremovably in the decoder casing. An alternative is made up of a circuit mounted on a base or connector such as a SIM module connector.

In a third form, the security module is integrated into an integrated circuit casing also having another function, for example in a descrambling module of the decoder or the microprocessor of the decoder.

In a fourth embodiment, the security module is not produced in material form, but rather its function is implemented in software form only. Given that in the four cases, although the security level differs, the function is identical, it is possible to refer to a security module regardless of the way the function is carried out or the form that this module may take.

Numerous multimedia units use a monolithic circuit for the processing of the audio/video signal, in particular for the decryption of this stream and the descrambling in order to supply the audio and video channels in an analogical form. This type of circuit comprises identification numbers and specific keys.

According to one embodiment, the encryption and decryption operations of the secure connection with the diffusion centre are carried out by this monolithic circuit. The session key is then loaded into this module. In this case, it is possible to encrypt the session key using a specific key of the monolithic module. Therefore, the message transmitted from the management centre to the multimedia unit can have the following security levels, with the understanding that a security module disposes of at least one global security key known to all the security modules and one unique key:

encryption of the session key Ki by the transport key Kt of the security module, the key, once decrypted by the security module is transmitted to the monolithic circuit using the security layer called "Pairing" (see EP1078524); message=(Ki)Kt encryption of the session key by the unique key of the specific circuit Kstb, then by the transport key of the security module in the message EMM. On receiving the message, the security module decrypts the message EMM using the transport key and obtains the session key Ki thanks to the unique key of the specific circuit. During an initialization stage, the unique key of the specific circuit is loaded into the security module. In order to transmit the session key to the specific circuit, the security module uses the pairing key Kp that secures all the exchanges between the security module and the specific circuit (see EP1078524): message=[(Ki)Kstd]Kt encryption of the session key by the unique key of the monolithic circuit, encryption by the transport key between the management centre and the security module (it should be noted that the diffusion centre and the management centre can be two separate entities, one being responsible for broadband diffusion, the other managing the content access rights); message=[(Ki)Kstd]Kt encryption of the session key Ki by the unique key of the monolithic circuit Kstb, and encryption by the specific key of the security module for the message transmitted to said security module.

BRIEF DESCRIPTION OF THE FIGURE

The invention will be better understood thanks to the following detailed description that refers to the annexed FIGURE that is given as a non-limitative example, and which shows the creation of a security connection between the diffusion centre and the multimedia unit.

DETAILED DESCRIPTION

Figure 1:
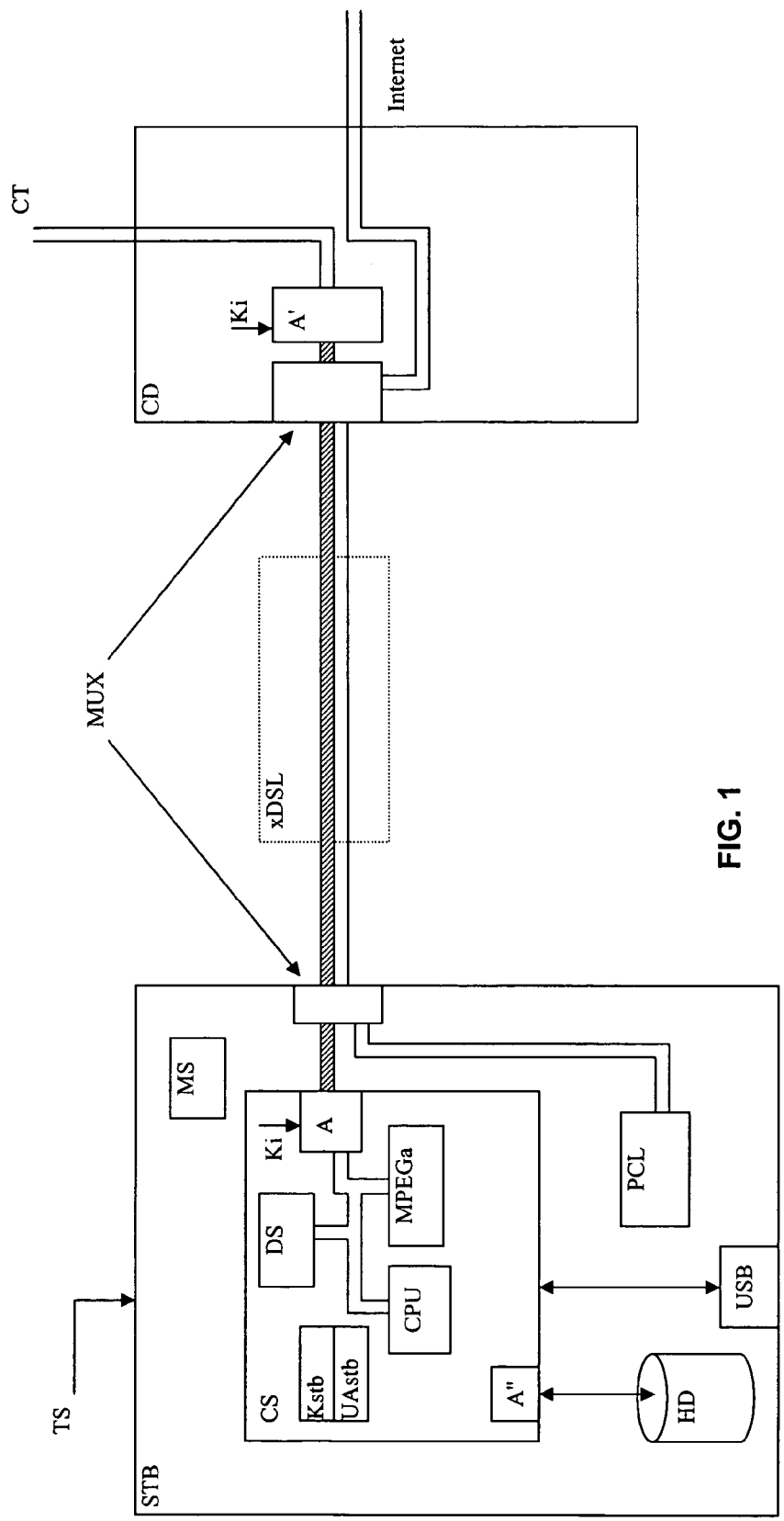

The multimedia unit STB has a centralized specialized circuit CS bringing together the majority of the processing functions of an audio/video stream and the rebroadcast functions towards external peripherals such as an MP3 reader. In particular, it includes a decryption unit DS of the contents encrypted by control words CW, an MPEG decrambler, a central unit CPU responsible for the management of the assembly and a decryption module A of the transport data. There is an important difference between the decryption unit DS and the encryption/decryption module A. The decryption unit DS is applied to data of the MPEG type, that is to say to the data filtered without the transport layer pertaining to an IP network. This unit is identical regardless of the source of the data, by IP or by other means such as by satellite or by cable (see TS entry).

The encryption/decryption module A is specific to the IP connection. It acts on the transport layer and secures the data in both directions. It is advantageously of the symmetrical type such as IDEA, TDES, Fox.

The multimedia STB unit furthermore disposes of an IDE or ATA interface towards a mass storage unit HD to store the contents for subsequent future visualization. The data from and towards this storage unit is encrypted by a key pertaining to the multimedia unit in order to prevent the dissemination of the contents towards other multimedia units. This type of key can be managed in the same way as the session key of the encryption/decryption module. Each digital peripheral such as a USB port disposes of a encryption/decryption layer matched with a session key which is managed by the management centre in a similar way to that described for the encryption/decryption module A. In this way a match is carried out between the management centre and the data passing through the output port of the specialized circuit CS.

The same is true for the USB interface where the data is also secured. According to the implementation type, this data protection layer can be produced by the same encryption/decryption module A that processes the stream transported by IP.

On the interior of the multimedia unit STB (as represented in the FIGURE) by means of a signed circuit, or by an external module generally in the form of a chip card, the security operations and the management of the rights are entrusted to a security module MS. This module includes all personalization of a subscriber, the rights connected to this subscriber, the specific and global keys managed by a management centre, or even a credit. The data originating from the DSL or TS source is filtered to extract the messages intended for this security module MS. The security module MS decrypts the messages received and transmits the data necessary for the correct working of the decryption unit DS such as the control words CW. Other security operations can be carried out such as, for example the reception of the message containing the session key Ki intended for the encryption/decryption module A.

It should be noted that the monolithic circuit CS disposes of specific keys $Kstb_n$ for security operations corresponding to associated digital peripherals.

According to an embodiment, the management centre, which in our example is independent of the diffusion centre but can be combined in the same unit, prepares a management message EMM intended for the security module. In this message the session key Ki encrypted by the specific key Kstb of the monolithic circuit CS is found. Therefore the message is made up of:

$$EMM=([Ki]_{Kstb})Kt$$

This message is also encrypted by the key pertaining to this type of message called transport key Kt. This key can be common to a large number of security modules MS or can be a key specific to a security module.

The multimedia unit STB is connected by a modem to a DSL line. It thus creates with the diffusion centre a secure channel whose session key is determined by the management centre. In the management centre, the data is transmitted to an encryption module A' of the same type as that of the multimedia unit.

According to a particular embodiment, the IP stream passing through the DSL line includes at least two logical channels. A first logic channel is formed by the channel secured by the session key Ki. The second channel is unsecured and allows access to services other than those managed by the diffusion centre. It is thus possible to take advantage of unsecured contents that remain in the unsecured PCL (light PC) environment of the multimedia unit.

According to another embodiment, the multimedia unit can receive and interpret messages called IRD commands. Therefore, the message containing the session key Ki is encrypted by the specific key Kstb of the monolithic circuit CS and formatted as a message intended only for the multimedia unit. The multimedia unit STB receives this message and transmits it to the specific circuit CS. The latter decrypts the message thanks to its specific key Kstb and extracts the session key Ki. The latter is to be used by the encryption/decryption module A of said specific circuit.

The invention claimed is:

1. Data transmission method between a diffusion center and a multimedia unit, the latter comprising a monolithic circuit having at least one unique key and a security module (MS) having a transport key, said diffusion center being connected to a management center, said management center having knowledge of the at least one unique key and the transport key, this method comprising the following steps:

generating a session key in the management center, transmitting the session key to the diffusion center, encrypting the session key in the management center using the unique key of the monolithic circuit to produce a management message, encrypting the management message using the transport key, transmitting an encrypted management message to the multimedia unit, transmitting the encrypted management message to the security module by way of the multimedia unit, decrypting the encrypted management message using the transport key in the security module to produce the encrypted session key, transmitting the encrypted session key to the monolithic circuit, decrypting the encrypted session key in the monolithic circuit using the unique key of said monolithic circuit, creating a secure data transfer connection by using the session key to encrypt and decrypt data as it passes between the diffusion center and the multimedia unit.

2. Data transmission method according to claim 1, wherein the transport key is a key common to several security modules.

3. Data transmission method according to claim 1, wherein the transport key is a key specific to the security module.

4. Data transmission method according to claim 1, wherein the diffusion center and the management center form one single entity.

5. Data transmission method according to claim 1, wherein the diffusion center and the management center form two distinct entities with communication means between each other.

6. Data transmission method according to claim 1, wherein the multimedia unit includes communication channels to which is applied an encryption/decryption layer using the session key.

* * * * *